United States Patent
Gubair et al.

(10) Patent No.: US 10,712,459 B2
(45) Date of Patent: Jul. 14, 2020

(54) FREQUENCY-BASED HORIZON INTERPRETATION BASED ON SEISMIC DATA

(71) Applicant: Saudi Arabian Oil Company, Dhahran (SA)

(72) Inventors: Mohammed Saleh Bin Gubair, Dammam (SA); Maher Al Marhoon, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 310 days.

(21) Appl. No.: 15/874,969

(22) Filed: Jan. 19, 2018

(65) Prior Publication Data

US 2019/0227186 A1    Jul. 25, 2019

(51) Int. Cl.
    G01V 1/30    (2006.01)
    G01V 1/34    (2006.01)
    G01V 1/36    (2006.01)

(52) U.S. Cl.
    CPC .......... *G01V 1/301* (2013.01); *G01V 1/345* (2013.01); *G01V 1/364* (2013.01); *G01V 2210/21* (2013.01); *G01V 2210/643* (2013.01)

(58) Field of Classification Search
    None
    See application file for complete search history.

(56) References Cited

U.S. PATENT DOCUMENTS

| 3,731,268 A | * | 5/1973 | Landrum, Jr. | ......... G01V 1/375 367/41 |
| 5,671,136 A | * | 9/1997 | Willhoit, Jr. | ............. G01V 1/30 702/18 |

(Continued)

FOREIGN PATENT DOCUMENTS

| CN | 101545983 | 9/2009 |
| CN | 102819040 | 12/2012 |
| CN | 105093290 | 11/2015 |

OTHER PUBLICATIONS

Bancroft and Burt, "A Frequency Synthesis Technique Using Digital Controlled Division," presented at the 18th Annual Symposium on Frequency Control, Feb. 1964, 13 pages.

Butorin and Krasnov, "Approaches to the Analysis of Spectral Decomposition for the Purpose of Detailed Geological Interpretation," SPE-182079-MS, SPE Russian Petroleum Technology Conference and Exhibition, Oct. 24-26, 2016, 15 pages.

Hardage, "Instantaneous Seismic Attribute Calculated by the Hilbert Transform," Search and Discovery Article #40563 on Jul. 17, 2010, 7 pages.

(Continued)

*Primary Examiner* — Roy Y Yi
(74) *Attorney, Agent, or Firm* — Fish & Richardson P.C.

(57) ABSTRACT

Seismic data obtained from a seismic survey conducted of a subterranean region is received. The seismic data includes multiple frequency components, having a frequency bandwidth. A target, to-be-picked horizon is identified by displaying well data on the seismic section and correlating the seismic reflector with layer tops in the well data. A horizon represents a seismic reflector between two geological layers in the subterranean region. A single frequency that gives rise to a predetermined continuity along the target horizon is determined from the frequency bandwidth of the seismic data. The seismic data is filtered to mono-frequency volumes. The mono-frequency seismic volumes include a single frequency component. A horizon is picked corresponding to the target horizon based on the mono-frequency volumes. The identified horizon corresponding to the target horizon is output for determining geological features of the subterranean region based on the identified horizon.

20 Claims, 10 Drawing Sheets

(56) References Cited

U.S. PATENT DOCUMENTS

| | | | |
|---|---|---|---|
| 5,894,417 | A | 4/1999 | Dorn |
| 6,131,071 | A | 10/2000 | Partyka |
| 6,498,989 | B1 | 12/2002 | Pisetski et al. |
| 7,248,539 | B2 | 7/2007 | Gorgos et al. |
| 7,398,158 | B2 | 7/2008 | Najmuddin |
| 8,265,876 | B1 | 9/2012 | Yu et al. |
| 8,849,574 | B2 | 9/2014 | Lomask |
| 2005/0125157 | A1 | 6/2005 | Toelle |
| 2011/0048731 | A1 | 3/2011 | Imhof et al. |
| 2011/0153218 | A1 | 6/2011 | Peng |
| 2016/0209530 | A1 | 7/2016 | Nguyen et al. |

OTHER PUBLICATIONS

Honorio et al., "Interpreting Seismic Frequency Section Based on ICA," presented at the 75th EAGE conference and exhibition incorporating SPE Europec, London, Jun. 2013, 6 pages.

Johann et al., "Spectral decomposition reveals geological hidden features in the amplitude maps from a deep water reservoir in the Campos Basin," SEG Technical Program Expanded Abstracts, Sep. 2003, 6 pages.

Montaigne, "Rational Virtualization Opens E&P Eyes," Hart's E&P, Landmark Technical Review 79, Oct. 2003, 2 pages.

Shi et al., "Prediction of Fluvial Sand Body Using the Technique of Frequency Division Interpretation," International Information and Engineering Technology Association, Environmental and Earth Sciences Research Journal, vol. 2, No. 2, 2015, 6 pages.

Zeng, "Frequency-Dependent Seismic Stratigraphy for High-Resolution Interpretation of Depositional Sequences," adapted from an oral Presentation at AAPG Annual Convention and Exhibition, Jun. 7-10, 2009, Search and Discovery Article #40501, Apr. 5, 2010, 27 pages.

Avseth et al., "Quantitative seismic interpreation: Applying rock physics tools to reproduce interpreation risk; Chapter 4—Common techniques for quantitative seismic interpretation," Jun. 10, 2010, 45 pages.

Chopra et al., "Enhancing interpretability of seismic data with spectral decomposition phase components," SEG Technical Program Expanded Abstracts 2015, Oct. 18-23, 2015, 5 pages.

Faraklioti and Petrou, "Horizon picking in 3D seismic data volumes," Machine Vision and Applications 15.4, Aug. 17, 2004, 4 pages.

Herron, "Pitfalls in horizon autopicking," Interpretation 3.1, Feb. 1, 2015, 2 pages.

Hoyes and Cheret, "A review of 'global' interpretation methods for automated 3D horizon picking," The Leading Edge 30.1, Jan. 2011, 8 pages.

Yu et al., "Automatic horizon picking in 3D seismic data using optical filters and minimum spanning tree (patent pending)," SEG Technical Program Expanded Abstracts 2011, Jan. 2011, 5 pages.

International Search Report and Written Opinion issued in International Application No. PCT/US2019/014136 dated Apr. 16, 2019, 14 pages.

Giroldi et al., "Using Spectral Decomposition to Identify and Characterize Glacial Valleys and Fluvial Channels within the Carboniferous Section in Bolivia," Section: Identification and Characterization; Channel Body Picking and Tracking, the Leading Edge, vol. 24, No. 11, Nov. 1, 2005, 7 pages.

Naseer et al., "Detection of cretaceous incised-valley shale for resource play, Miano gas field, SW Pakistan: Spectral decomposition using continuous wavelet transform," Journal of Asian Earth Sciences, vol. 147, Jul. 21, 2017, 20 pages.

Zeng, "Strata slicing, part II: real 3-D seismic data," Geophysics, Society of Exploration Geophysicists, vol. 63, No. 2, Mar. 1, 1998, 9 pages.

Alvarez, "Attenuation of Multiples in Image Space," Dissertation for Doctor of Philosophy, Department of Geophysics, Stanford University, Sep. 2007, 160 pages.

Cao "Analysis and Application of Radon Transform," MSC Thesis, Department of Geology and Geophysics, University of Calgary, Dec. 2006, 101 pages.

Peacock et al, "Predictive Deconvolution: Theory and Practice," Geophysics, 34, 2, Apr. 1969, pp. 155-169.

Verschuur et al, "Adaptive surface related multiple elimination," Geophysics, 57, 9, pp. 1166-1177, Sep. 1992.

Weglein et al, "Multiple Attenuation: Recent Advances and the Road Ahead", The Leading Edge, Aug. 2011, pp. 864-875.

\* cited by examiner

FREQUENCY-BASED HORIZON INTERPRETATION BASED ON SEISMIC DATA

BACKGROUND

Horizons refer to surfaces or seismic reflectors that separate different rock layers in depositional environments. For example, a horizon can be a boundary between two different geological layers in a subterranean region. Horizon picking or tracking refers to a process of identifying or determining a seismic reflector between two geological layers. Horizon picking can be performed manually or automatically. For example, software tools can execute auto horizon picking algorithms to perform horizon picking automatically based on seismic data. Both manual horizon picking and auto horizon picking can be difficult, time consuming, and error-prone because of the complexity of the geology, poor signal to noise ratio of the seismic data, or both.

SUMMARY

The present disclosure describes frequency-based horizon interpretation based on seismic data.

In an implementation, seismic data obtained from a seismic survey conducted of a subterranean region is received. The seismic data includes multiple frequency components, having a frequency bandwidth. A target to-be-picked horizon is identified based on the seismic data. A horizon represents a seismic reflector between two geological layers in the subterranean region. A single frequency that gives rise to a predetermined continuity along the target horizon is determined from the frequency bandwidth of the seismic data. The seismic data is filtered to mono-frequency volumes. The mono-frequency volumes include a single frequency component. A horizon is identified by displaying well data on the seismic section and correlating the seismic reflector with layer tops in the well data. The identified and picked horizon is used for determining geological features of the subterranean region.

In a second implementation, a non-transitory, computer-readable medium stores one or more instructions executable by a computer system to perform the following operations. Seismic data of a subterranean region is received. The seismic data includes multiple frequency components and has a frequency bandwidth spanning a spectrum in a frequency domain. The seismic data is obtained from a seismic survey conducted on the subterranean region. A target horizon is identified based on the seismic data. The target horizon is a horizon to be picked based on the seismic data. The horizon represents a seismic reflector between two geological layers in the subterranean region. A single frequency is determined from the frequency bandwidth of the seismic data that gives rise to a predetermined continuity along the target horizon. The seismic data includes multiple frequency components, which are filtered to mono-frequency seismic data at the single frequency. The mono-frequency seismic data includes a single-frequency component at the single frequency. A horizon corresponding to the target horizon is picked based on the mono-frequency seismic data. The identified horizon corresponding to the target horizon is output for determining geological features of the subterranean region based on the identified horizon.

In a third implementation, a computer-implemented system includes one or more computers and one or more computer memory devices interoperably coupled with the one or more computers. The one or more computer memory devices have tangible, non-transitory, machine-readable media storing one or more instructions. The one or more instructions are executable by a computer system to perform the following operations. Seismic data of a subterranean region is received. The seismic data includes multiple frequency components and has a frequency bandwidth spanning a spectrum in a frequency domain. The seismic data is obtained from a seismic survey conducted on the subterranean region. A target horizon is identified based on the seismic data. The target horizon is a horizon to be picked based on the seismic data. The horizon represents a seismic reflector between two geological layers in the subterranean region. A single frequency is determined from the frequency bandwidth of the seismic data that gives rise to a predetermined continuity along the target horizon. The seismic data includes multiple frequency components, which are filtered to mono-frequency seismic data at the single frequency. The mono-frequency seismic data includes a single-frequency component at the single frequency. A horizon corresponding to the target horizon is picked based on the mono-frequency seismic data. The identified horizon corresponding to the target horizon is output for determining geological features of the subterranean region based on the identified horizon.

The foregoing and other described implementations can each, optionally, include one or more of the following features.

As a first feature, combinable with any of the following features, determining a single frequency from the frequency bandwidth of the seismic data that gives rise to a predetermined continuity along the target horizon include one or more of the following operations. The seismic data is decomposed into a number of mono-frequency seismic data at a number of frequencies. A number of respective horizons are picked based on the number of mono-frequency seismic data. Out of the number of respective horizons, a horizon that has the predetermined continuity along the target horizon is determined. The single frequency that gives rise to the horizon that has the predetermined continuity along the target horizon is determined.

As a second feature, combinable with any of the previous or following features, the horizon that has the predetermined continuity along the target horizon includes a horizon that has a maximum continuity along the target horizon among the number of respective horizons.

As a third feature, combinable with any of the previous or following features, outputting the identified horizon includes displaying the identified horizon on an image of the seismic data.

As a fourth feature, combinable with any of the previous or following features, identifying a target horizon based on the seismic data includes receiving a user's selection of the target horizon based on the seismic data.

As a fifth feature, combinable with any of the previous or following features, the method the operations include determining geological features of the subterranean region based on the identified horizon.

As a sixth feature, combinable with any of the previous or following features, determining geological features of the subterranean region based on the identified horizon includes estimating a thickness of a geological layer between the identified horizon and another horizon of the subterranean region.

Implementations of the described subject matter, including the previously described implementation, can be implemented using a computer-implemented method, a non-transitory, computer-readable medium or a computer-implemented system. The medium can store computer-readable instructions to perform the computer-implemented method. The system can include one or more computer memory devices interoperably coupled with one or more computers and with the computer-readable medium.

The subject matter described in this specification can be implemented in particular implementations, so as to realize one or more of the following advantages. First, the described subject matter can improve the auto horizon picking process by providing more reliable and consistent horizon picks. Second, the described subject matter can accelerate the process of horizon picking while enhancing the quality of the horizon picks. Other advantages will be apparent to those of ordinary skill in the art.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

Figure 1A:
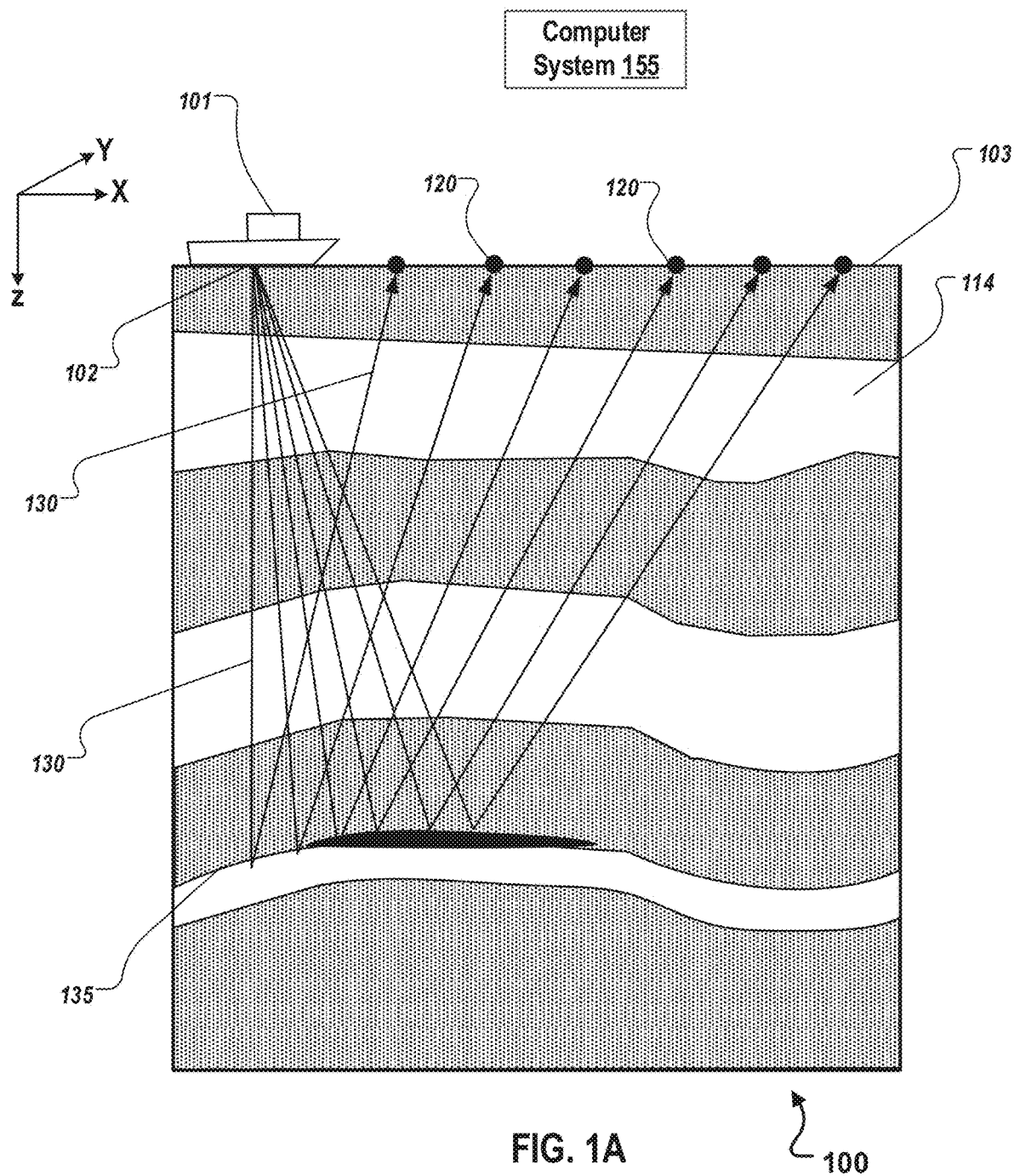
FIG. 1A is a diagram illustrating an example seismic survey system and a computer system for frequency-based horizon interpretation based on seismic data, according to an implementation of the present disclosure.

Seismic data contains information about various geological features. Seismic data can be obtained from seismic surveys to image geological structures of a subterranean region. Seismic data can include two-dimensional (2D) seismic slices, three-dimensional (3D) seismic volumes, or higher dimensional data to reflect geologic structural and stratigraphic features such as subsurface faults and unconformities that are commonly associated with hydrocarbon discoveries.

Typically, seismic data can have a frequency bandwidth that ranges from 10 Hz to 80 Hz. The seismic data components at different frequencies contain information about various geological features. Example techniques of frequency-based horizon interpretation based on seismic data are disclosed. Horizon interpretation can include horizon picking, as well as the processing of the picked horizon for deriving additional information of a subterranean region. As described previously, horizon picking is also referred to as horizon tracking. Horizon picking refers to a process of determining, selecting, or otherwise identifying a horizon that represents a seismic reflector between two geological layers.

Unlike conventional techniques that perform horizon picking on full stack seismic volumes and use the full bandwidth of frequencies present in the seismic data, the described techniques perform horizon picking based on mono-frequency seismic data (or single-frequency seismic data). For example, conventional horizon interpretations are performed on the full stack volumes that contain the full bandwidth of frequencies ranging from 10 Hz to 80 Hz. By contrast, the described techniques use seismic volumes that are filtered to a single frequency and then perform the horizon picking on the filtered single-frequency seismic volumes.

In some implementations, continuity features of layer reflectors in seismic data can be better observed at single frequency volumes rather than full stack seismic volumes. The continuity can refer to a lateral distance from a specified location and in a specified azimuthal direction for which a reflection character of a seismic event is essentially unchanged. In some implementations, using mono-frequency seismic data can help reduce or remove noise created by different sources that occurs at certain specific frequencies. Similarly, using mono-frequency seismic data can help reduce or remove effects of multiples generated from shallow reflectors that would affect an image of a deeper geological reflector. For example, the imaging of specific geological features, such as a boundary between two geological layers, can be improved at a specific mono-frequency and the accuracy of horizon picking can be enhanced by using mono-frequency seismic data.

In some implementations, the described techniques of frequency-based horizon interpretation can perform horizon interpretation based on mono-frequency seismic data. In some implementations, the seismic data include 3D seismic volumes. The 3D seismic volumes can be full stack seismic volumes that span the full bandwidth of the seismic data (for example, from 10 Hz to 80 Hz). In some implementations, for the frequency-based horizon interpretation, a mono frequency or a single frequency that provides the largest continuity along a targeted horizon can be determined. A mono-frequency seismic data can be generated by filtering an original seismic volume (for example, the full stack seismic volumes) to the single frequency. For example, the mono-frequency seismic data can include mono-frequency volumes that include a single frequency component of the seismic data. A horizon can be picked on the filtered mono-frequency seismic data. The picked horizon can then be displayed on the full stack seismic volume.

Compared to conventional techniques that are labor intensive and may fail when there is a change in the reflector continuity, which is often present in the full stack seismic volumes, the described techniques can provide a faster and more reliable method for horizon picking. In some implementations, the described techniques can produce a monofrequency seismic volume that provides a continuous horizon where the horizon is smooth, thus facilitating horizon picking with a minimum noise impact.

In some implementations, the described techniques can improve reliability of horizon picking and decrease risk in hydrocarbon exploration by a more effective prospect generation process. For example, the described techniques can reduce uncertainties in reservoir depth estimation and improve discovery by mapping different geological features and locating potential areas for drilling. In some implementations, the described techniques can complement and improve the conventional techniques.

In some implementations, the output of the described techniques can be provided as a report that includes picked or identified seismic horizons from the seismic data. The output of the described techniques can also include interpretations of the horizons. For example, the described techniques can be implemented as a module that is internal or external to a seismic interpretation system. The described techniques can decompose the seismic data into different frequency components for an auto picker (for example, an automated horizon picking module in the seismic interpretation system) to work effectively, which saves interpretation time and improves quality.

In some implementations, the seismic interpretation system can use the identified seismic horizons to generate maps and attributes for estimating the thickness of geological layers and evaluating the feasibility of any hydrocarbon discovery of the subterranean region. Additionally, the output of the described techniques can be used to estimate the hydrocarbon reserve of a reservoir, locate drilling locations of the subterranean region, and so on. In some implementations, the identified seismic horizons and other interpreted features of the subterranean region can be displayed on the stack seismic volumes, for example, for the review and analysis of seismic data interpreters or experts.

FIG. 1A is a diagram showing an example seismic survey system 100 and a computer system 155 for frequency-based horizon interpretation based on seismic data, according to an implementation of the present disclosure. The example seismic survey system 100 can be used to acquire seismic data, and the computer system 155 can receive the seismic data and perform frequency-based horizon interpretation based on the seismic data, for example, according to an example method 150 shown in FIG. 1B. In the illustrated example, the seismic survey system 100 is used for acquiring seismic data of a subterranean region 114. A seismic survey system can be implemented on land, offshore, or in another subterranean region.

The computer system 155 can include one or more computing devices or systems. The computer system 155 or any of its components can be located apart from the other components shown in FIG. 1A. For example, the computer system 155 can be located at a data processing center, a computing facility, or another suitable location. The seismic survey system 100 can include additional or different features, and the features of the seismic survey system can be arranged as shown in FIG. 1A or in another configuration.

The example seismic survey system 100 includes a source vehicle 101 (for example, a truck or a ship) carrying navigation equipment and an energy source 102 (for example, a seismic air-gun). Multiple receivers 120 (for example, geophones, hydrophones, or a combination of them) can be deployed on or near the ground or sea surface 103. The energy source 102 can generate waves 130 (for example, in the form of sound or acoustic waves) beneath the ground or sea surface 103. The waves 130 can travel in the subterranean region 114. The waves 130 can be reflected by a seismic reflector 135 (for example, a layer boundary) and recorded by the receivers 120. In this manner, subsurface sedimentary structures that trap oil such as faults, folds, and domes, can be mapped by the reflected waves 130. The amplitude, phase, frequency, and travel time information of the waves 130 at specified (x, y, z) locations within the subterranean region 114 can be recorded as seismic data. For example, the frequency information of the seismic data can be used for horizon interpretation, according to the techniques described in this disclosure.

Figure 1B:
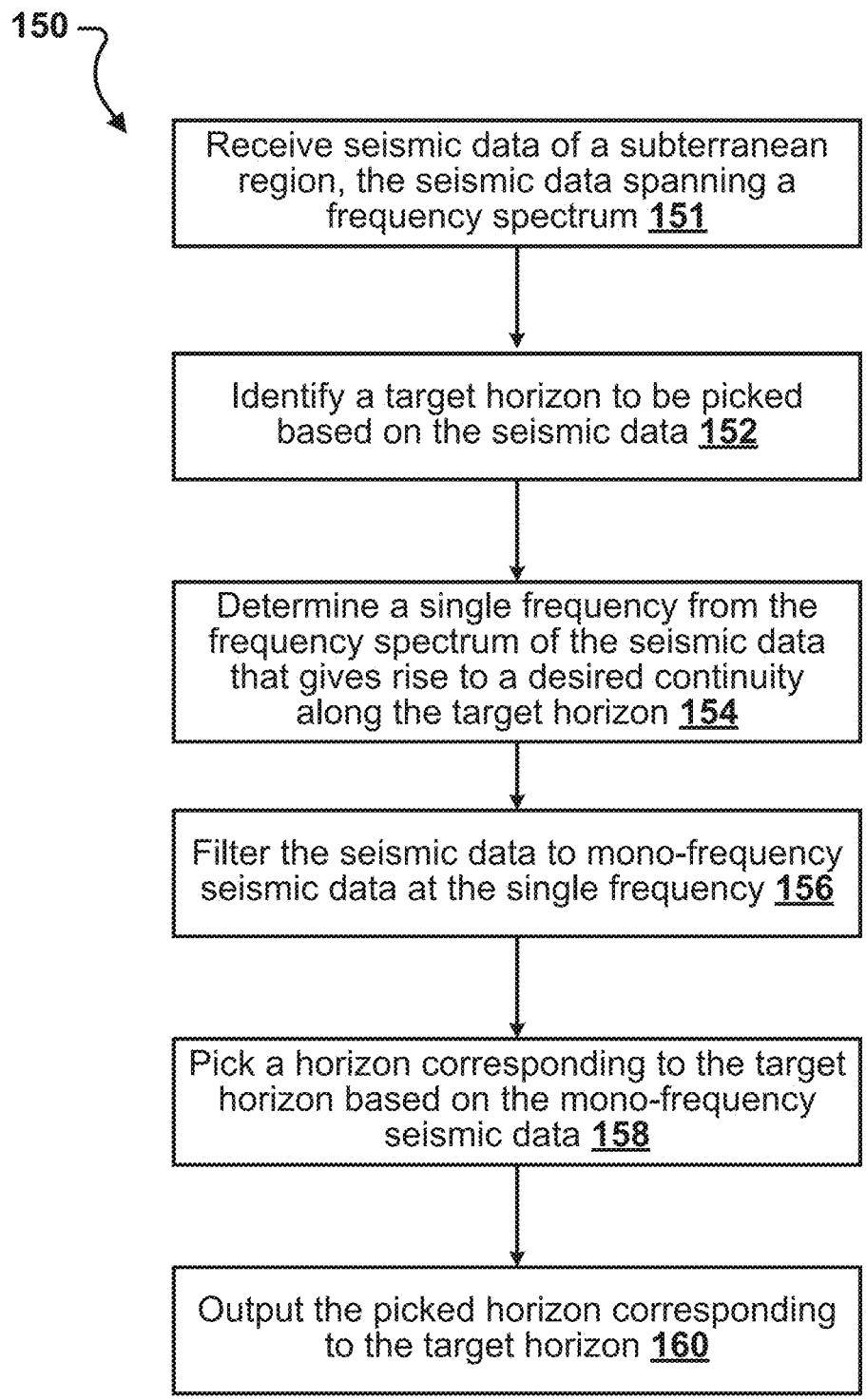
FIG. 1B is a flowchart illustrating an example of a method for frequency-based horizon interpretation based on seismic data, according to an implementation of the present disclosure.

FIG. 1B is a flowchart illustrating an example of a method 150 for frequency-based horizon interpretation based on seismic data according to an implementation of the present disclosure. For clarity of presentation, the description that follows generally describes method 150 in the context of the other figures in this description. However, it will be understood that method 150 can be performed, for example, by any system, environment, software, and hardware, or a combination of systems, environments, software, and hardware, as appropriate. In some implementations, various steps of method 150 can be run in parallel, in combination, in loops, or in any order. In some implementations, various steps of method 150 can be performed manually or automatically, for example, by data processing apparatus.

At 151, seismic data of a subterranean region is received. The seismic data can be received by a data processing apparatus (for example, one or more processor(s) of the computer system 155 in FIG. 1A or a computer system 900 in FIG. 9). In some implementations, the seismic data can be stored in a computer-readable medium (for example, memory) and the data processing apparatus can load, retrieve, or otherwise receive the seismic data from the computer-readable medium. The seismic data can be collected, for example, by receivers during a seismic survey conducted of the subterranean region. The subterranean region can include one or more of a rock formation, a reservoir, or other areas of interest under the earth's surface (for example, a sea surface or ground surface). For example, as described with respect to FIG. 1A, the seismic survey can use a seismic wave source to generate seismic waves (for example, waves 130). Each wave transmitting in the subterranean region can be reflected by one or more reflectors (for example, subsurfaces in the subterranean region) and detected by one or more seismic receivers (for example, geophones) that record seismic waves.

Rather than having a single frequency, the seismic data typically includes multiple frequency components and has a bandwidth spanning a spectrum or a range in a frequency domain. For example, the recorded seismic data can have a bandwidth spanning 10-80 Hz in the frequency domain.

The seismic data can include 2D, 3D, or higher dimensional seismic data. For example, the seismic data can include 3D seismic volumes. Each 3D seismic volume can include sets of seismic traces organized into 2D seismic lines, where each trace has respective x and y coordinates and each data point of the trace corresponds to a certain seismic travel time or depth (t or z). In some implementations, the described techniques can be applied to 2D seismic data such as the 2D seismic lines. In some implementations, the seismic data can include full stack seismic volumes that span the full bandwidth of the seismic data (for example, from 10 Hz to 80 Hz). From 151, method 150 proceeds to 152.

At 152, a target horizon based on the seismic data is identified. The target horizon is a horizon to be picked based on the seismic data. A horizon can represent a seismic reflector between two geological layers in the subterranean region. The target horizon can be identified by the data processing apparatus. In some implementations, the data processing apparatus identifies a target horizon by receiving, determining, or otherwise identifying a selection of the target horizon (also referred to as a to-be-picked or to-be-identified horizon). The selection of the target horizon can be performed manually by a user (for example, a seismic data interpreter) or automatically by the data processing apparatus. The selection can depend on many factors, such as a zone of interest. For example, identifying the target horizon based on the seismic data can include receiving a user's selection of the target horizon based on the seismic data.

In some implementations, the data processing apparatus can render a graphic user interface (GUI) on a display device of a computer system for displaying an image of the seismic data. The user can review the image of the seismic data and select the target horizon through user interaction with the image of the seismic data. For example, the user's selection of the target horizon can include the user's click, touch, gesture, or placement of a cursor or any other user interaction with the image of the seismic data through the GUI. In some implementations, the user's selection of the target horizon can include a text input of coordinates of an area of interest in the subterranean region of the seismic data. In some implementations, the target horizon can be selected by displaying well data on the seismic section and correlating the seismic reflector with layer tops in the well data. For example, during a drilling process of a well, formation tops can be identified based on factors, such as cuttings collected at the well locations, wireline logs, and regional geological studies. The formation tops indicate the beginning of geological layers or bodies. The formation tops are equivalent to the seismic horizons but only at the well location. In some implementations, the wireline logs of the wells and the identified formation tops on the wells are correlated with a seismic section (one of the seismic lines from the seismic volume that passes through or near the well location). Then, the seismic horizon can be correlated to the formation tops, for example, based on geology to map each seismic reflector to a geological body or feature. Then, the horizon can be identified or picked manually by the user or automatically by the data processing apparatus. In some implementations, the target horizon can be a point, a line segment, or an area that is a part of the ultimately identified horizon, or approximate to the ultimately identified horizon. From 152, method 150 proceeds to 154.

At 154, from the frequency bandwidth of the seismic data, a single frequency that gives rise to a predetermined continuity along the target horizon is determined. In some implementations, the single frequency that gives rise to the predetermined continuity along the target horizon can be determined based on empirical knowledge, past experiments, or a search among different frequencies within the frequency bandwidth of the seismic data. In some implementations, the single frequency can be determined automatically by the data processing apparatus. For example, in determining the single frequency, the data processing apparatus decomposes the seismic data into a number of mono-frequency seismic data at a number of frequencies. For each of the number of mono-frequency seismic data, the data processing apparatus identifies, determines, selects, or otherwise picks a respective horizon based on the mono-frequency seismic data. As a result, a number of respective horizons are identified corresponding to the number of mono-frequency seismic data. The data processing apparatus then determines out of the number of respective horizons a horizon that has the predetermined continuity along the target horizon. The data processing apparatus then determines the single frequency that gives rise to the horizon that has the predetermined continuity along the target horizon. In some implementations, the horizon that has the predetermined continuity along the target horizon includes a horizon that has a maximum continuity along the target horizon among the number of respective horizons. In some implementations, the horizon that has the predetermined continuity along the target horizon includes a horizon that has a continuity along the target horizon exceeding a predetermined threshold. Additional or different criteria can be defined for the horizon that has the predetermined continuity along the target horizon.

As an example of the search-based method for determining the single frequency, consider the seismic data with a frequency bandwidth ranging from 10 Hz to 60 Hz. A search step of 5 Hz, 10 Hz, or similar values can be used by the data processing apparatus to find the single frequency that gives rise to the predetermined continuity along the target horizon. In some implementations, the search can start by selecting or otherwise identifying a representative 2D seismic line (for example, 2D seismic lines 215, 315, 415, 515, 615, 715. and 815 in FIGS. 2-8, respectively) by the data processing apparatus. As described previously, the data processing apparatus can decompose the seismic data into mono-frequencies, assess the horizon continuity level at each frequency, and select the frequency that gives rise to the predetermined continuity. An example process of determining a frequency that gives the largest continuity along the target horizon is described with reference to FIGS. 3-8.

In the following, horizon picking using full stack seismic volume that contains the full bandwidth of frequencies is described with reference to FIG. 2, where a cross section of seismic data with a full stack of frequencies is shown. Horizon picking using different mono-frequency seismic volumes is described with reference to FIGS. 3-8, in each of which a cross section of the seismic data with a respective mono-frequency is shown. Each time, a single target horizon at the same location is selected (for example, by a user) in the respective seismic volumes of FIGS. 2-8. In response to the selection of the target horizon, a horizon (for example, a whole horizon in the 3D volume) corresponding to the selected target horizon can be identified, for example, manually by a user or automatically by the data processing apparatus executing an auto-picker or auto-tracker tool (for example, a module available in seismic interpretation software).

As an example of manual horizon picking, for each line in the 3D seismic volume, a user can review and interact with an image of the 3D seismic volume that is represented on a GUI. In some implementations, the user places a cursor on a target horizon and clicks on points along the target horizon on the image of the 3D seismic volume. The clicked points can be connected together to form the manually picked horizon.

As an example of automatic horizon picking, the data processing apparatus executing an auto-picker (for example, a 2D or a 3D auto picker) can automatically identify multiple points in different locations near or along the target horizon to form an automatically picked horizon. In some implementations, the auto picker performs an auto picking algorithm (for example, an optimization algorithm) for horizon picking. The auto picking algorithm can receive a specific location of a seismic trace (for example, a location of the target horizon selected by the user based on the coordinates of the seismic trace) as an input, and search for same or similar features in the adjacent seismic traces. The adjacent seismic traces with the same or similar features can be identified, collected, and then output by the auto picking algorithm as the picked horizon. In some instances, the features are not exactly the same along the actual horizon due to noise or multiples. As such, the auto picking algorithm may not be able to pick a location along the actual horizon or may pick a location in the trace that is not geologically correct. In the case of a 3D auto picker, the data processing apparatus executing the 3D auto picking algorithm can identify the horizon as a 3D surface. In some implementations, the 3D auto picker can reuse the functionalities of the 2D auto picker. For example, the 3D auto picker can perform the 2D auto picking algorithm to identify a 2D horizon for each 2D seismic line in the 3D seismic volume. The multiple identified 2D horizons for the multiple 2D seismic lines in the 3D seismic volume can form a 3D horizon surface and return as the identified 3D horizon picked by the 3D auto picker. In some implementations, the identified 3D horizon can be displayed through the GUI for further error check and fixing, for example, by the user. In some implementations, the time required to fix those errors can be long.

The proposed method can help address the problems and improve the accuracy and speed of horizon picking. In some implementations, the seismic volume (for example, a full stack seismic volume) is filtered at different single frequencies so that multiple seismic volumes, each of which is with a single frequency, are generated. Then a seismic line (for example, line 215) is selected from the seismic volume (the same line in all single-frequency seismic volumes), for example, by a single click by a user in the exact location on the horizon in each single-frequency seismic volume (for example, line 215, 315, 415, 515, 615, 715, or 815 in FIGS. 2-8, respectively). The segments 210, 310, 410, 510, 610, 710, and 810 shown in FIGS. 2-8 are horizons identified by the auto picker. The bigger the segment along the horizon the better.

Figure 2:
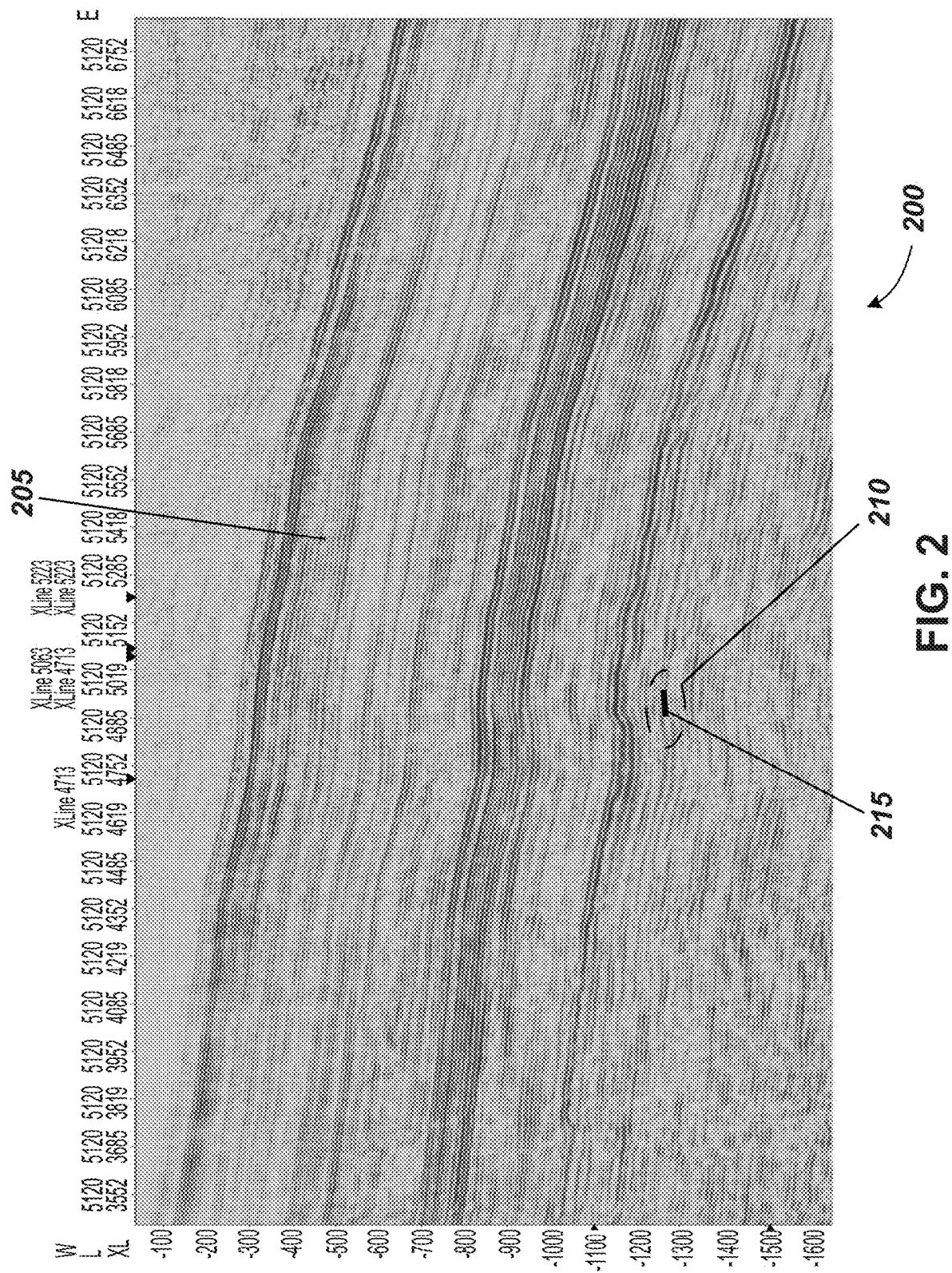
FIG. 2 is a data plot illustrating an example result of auto horizon picking performed on an original seismic volume with a full bandwidth of frequencies, according to an implementation of the present disclosure.

FIG. 2 is a data plot illustrating an example result 200 of auto horizon picking performed on an original seismic volume 205 with a full bandwidth of frequencies, according to an implementation of the present disclosure. The original seismic volume 205 includes seismic data of a subterranean region, which has a bandwidth ranging from 10-60 Hz. The original seismic volume 205 is displayed in the data plot as shown in FIG. 2, for example, through a GUI rendered by a computer system. A 2D auto-tracker is used to perform the auto horizon picking algorithm on the original seismic volume 205 with the full bandwidth of frequencies. The auto-tracker receives a selection of a target horizon 215. The target horizon 215 can reflect a reflector in the subterranean region. The target horizon 215 can be selected by a user through an interaction with the GUI, for example, through a single click in an area of interest on the displayed original seismic volume 205. In response to receiving the target horizon 215, the auto-tracker performs an auto-picking algorithm and picks a horizon 210 corresponding to the target horizon 215. The identified horizon 210 has a small segment near the location on the target horizon 215.

Figure 3:
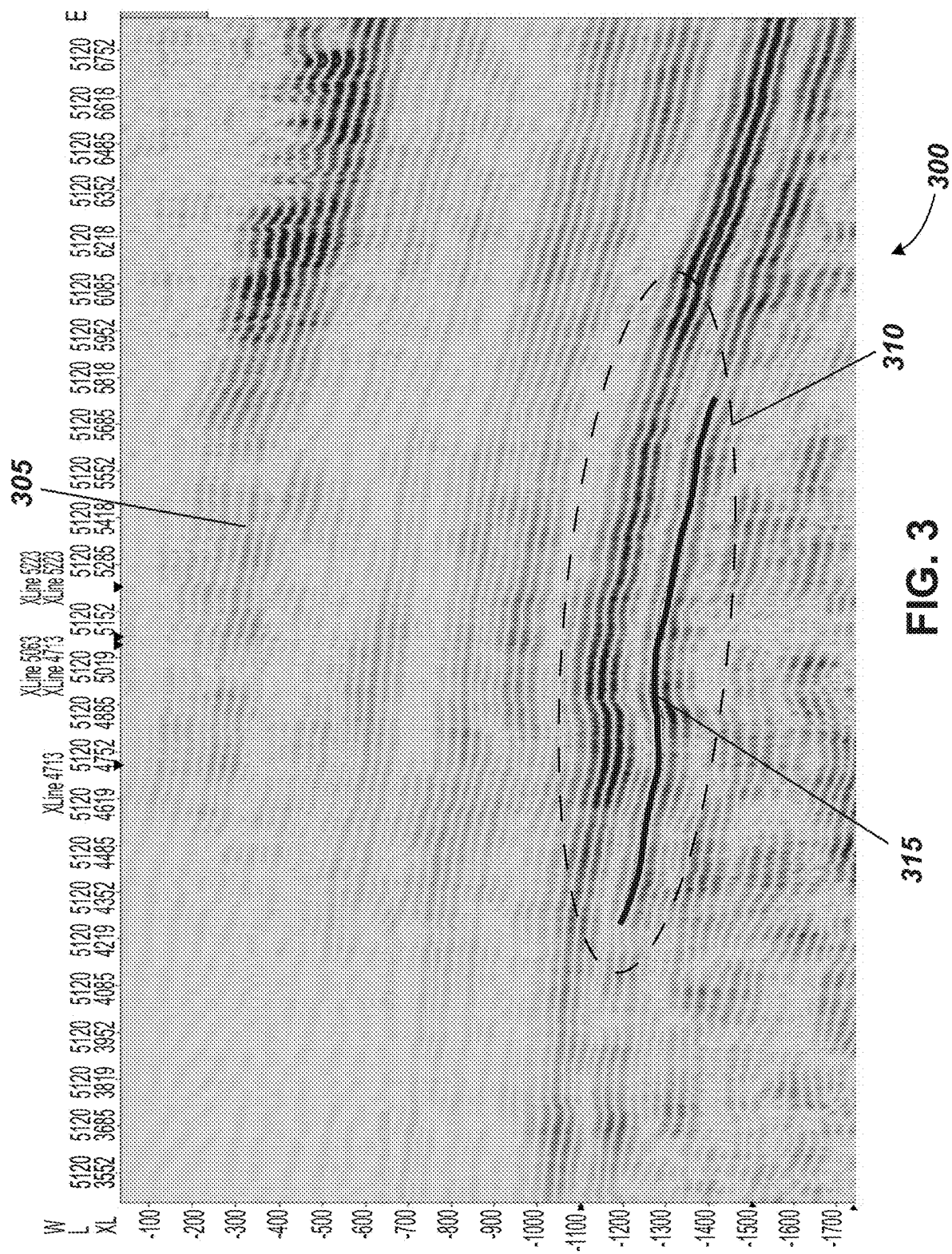
FIG. 3 is a data plot illustrating an example result of auto horizon picking performed on a 10 hertz (Hz) filtered seismic volume, according to an implementation of the present disclosure.

FIG. 3 is a data plot illustrating an example result 300 of auto horizon picking performed on a 10 Hz filtered seismic volume 305, according to an implementation of the present disclosure. The 10 Hz filtered seismic volume 305 can be obtained by filtering the original seismic volume 205 used in FIG. 2 at a single frequency of 10 Hz. The 10 Hz filtered seismic volume 305 is displayed in the data plot as shown in FIG. 3, for example, through the GUI rendered by the computer system. The target horizon 215 of the original seismic volume 205 shown in FIG. 2 has a corresponding location 305 on the 10 Hz filtered seismic volume 305 shown in in FIG. 3. The 2D auto-tracker is used to pick a horizon 310 corresponding to the location 315 that corresponds to the target horizon 215 in FIG. 2. In the example shown in FIG. 3, the identified horizon 310 has a considerably longer segment compared to the horizon 210 in FIG. 2.

Figure 4:
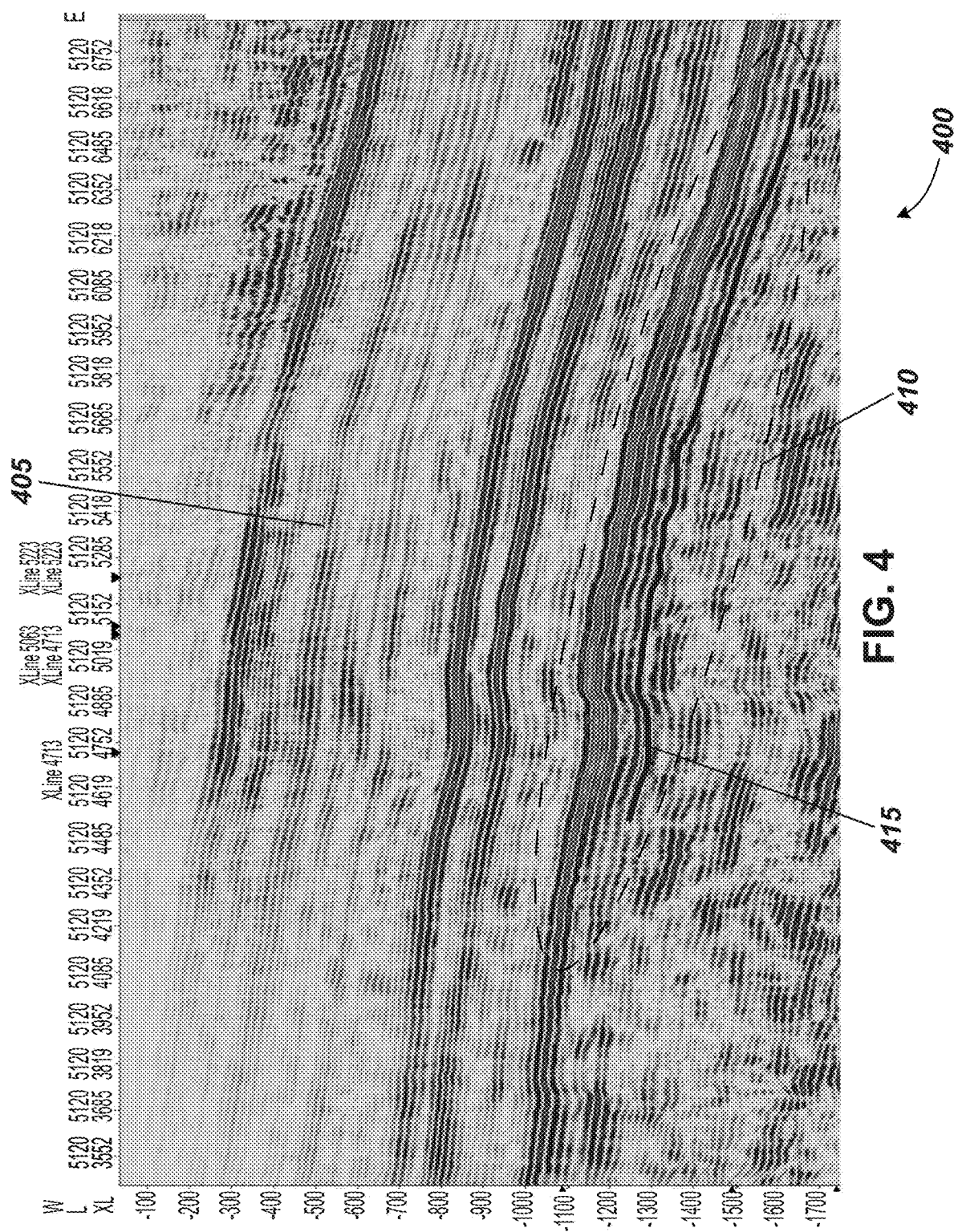
FIG. 4 is a data plot illustrating an example result of auto horizon picking performed on a 20 Hz filtered seismic volume, according to an implementation of the present disclosure.

FIG. 4 is a data plot illustrating an example result 400 of auto horizon picking performed on a 20 Hz filtered seismic volume 405, according to an implementation of the present disclosure. The 20 Hz filtered seismic volume 405 can be obtained by filtering the original seismic volume 205 used in FIG. 2 at a single frequency of 20 Hz. The 20 Hz filtered seismic volume 405 is displayed in the data plot as shown in FIG. 4, for example, through the GUI rendered by the computer system. The 2D auto-tracker is used to pick a horizon 410 corresponding to a location 415 that corresponds to the target horizon 215 in FIG. 2. In the example shown in FIG. 4, the identified horizon 410 is even longer than the horizon 310 in FIG. 3.

Figure 5:
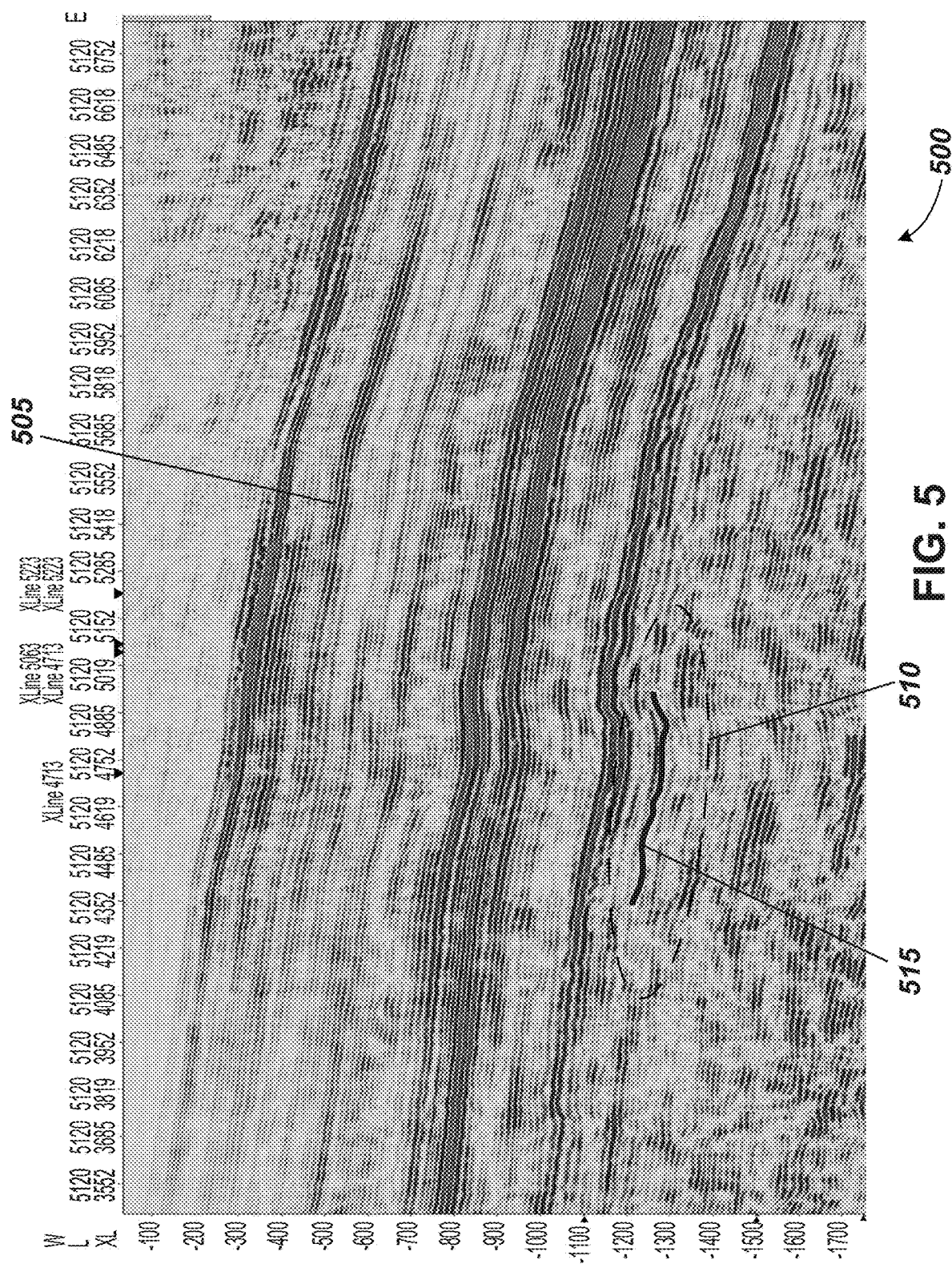
FIG. 5 is a data plot illustrating an example result of auto horizon picking performed on a 30 Hz filtered seismic volume, according to an implementation of the present disclosure.

FIG. 5 is a data plot illustrating an example result 500 of auto horizon picking performed on a 30 Hz filtered seismic volume 505, according to an implementation of the present disclosure. The 30 Hz filtered seismic volume 505 can be obtained by filtering the original seismic volume 205 used in FIG. 2 at a single frequency of 30 Hz. The 30 Hz filtered seismic volume 505 is displayed in the data plot as shown in FIG. 5, for example, through the GUI rendered by the computer system. The 2D auto-tracker is used to pick a horizon 510 corresponding to a location 515 that corresponds to the target horizon 215 in FIG. 2. In the example shown in FIG. 5, the identified horizon 510 is shorter, but with more detail than the identified horizon 410 in FIG. 4.

Figure 6:
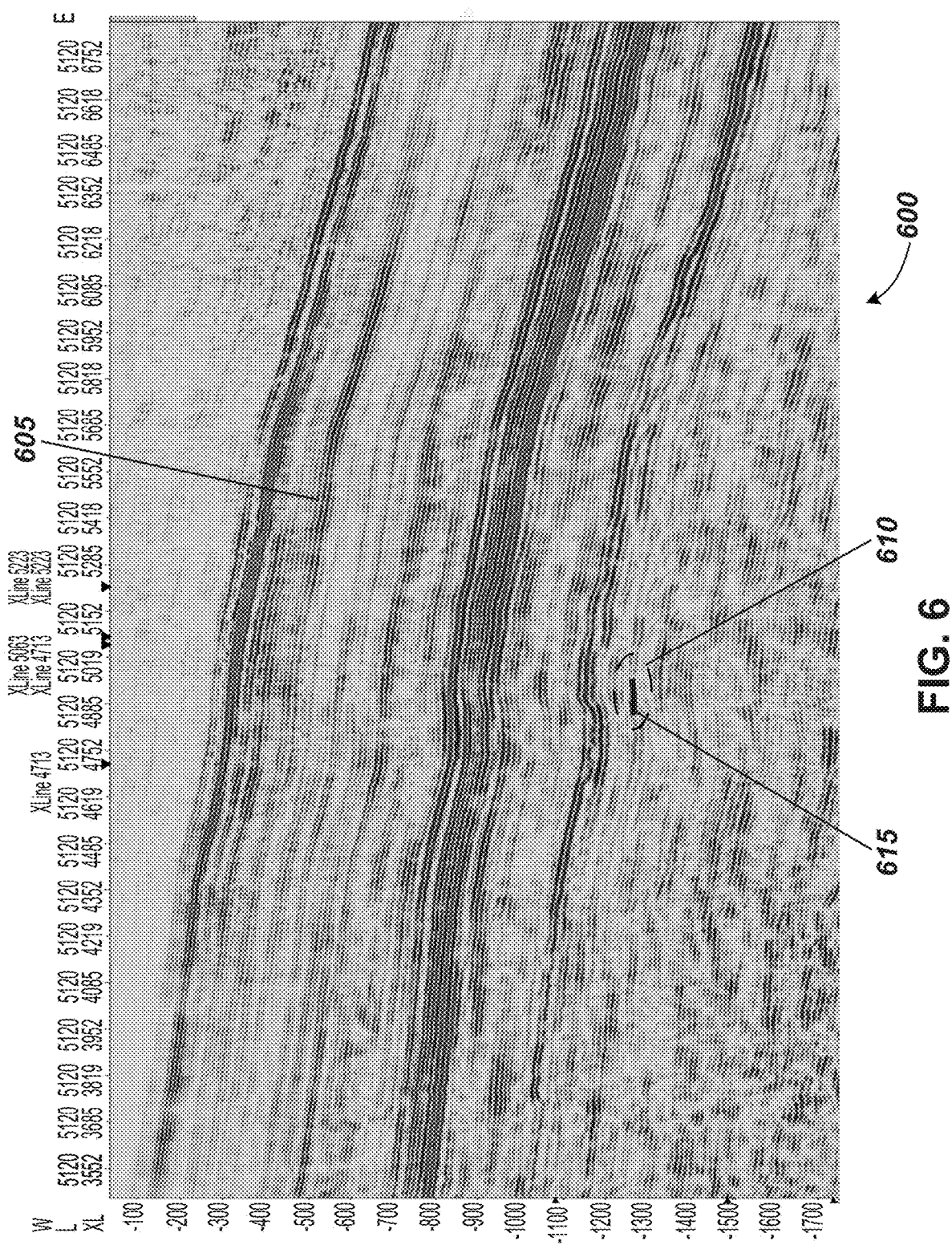
FIG. 6 is a data plot illustrating an example result of auto horizon picking performed on a 40 Hz filtered seismic volume, according to an implementation of the present disclosure.

FIG. 6 is a data plot illustrating an example result 600 of auto horizon picking performed on a 40 Hz filtered seismic volume 605, according to an implementation of the present disclosure. The 40 Hz filtered seismic volume 605 can be obtained by filtering the original seismic volume 205 used in FIG. 2 at a single frequency of 40 Hz. The 40 Hz filtered seismic volume 605 is displayed in the data plot as shown in FIG. 6, for example, through the GUI rendered by the computer system. The 2D auto-tracker is used to pick a horizon 610 corresponding to a location 615 that corresponds to the target horizon 215 in FIG. 2. In the example shown in FIG. 6, the identified horizon 610 is significantly shorter than the identified horizon 410 in FIG. 4.

Figure 7:
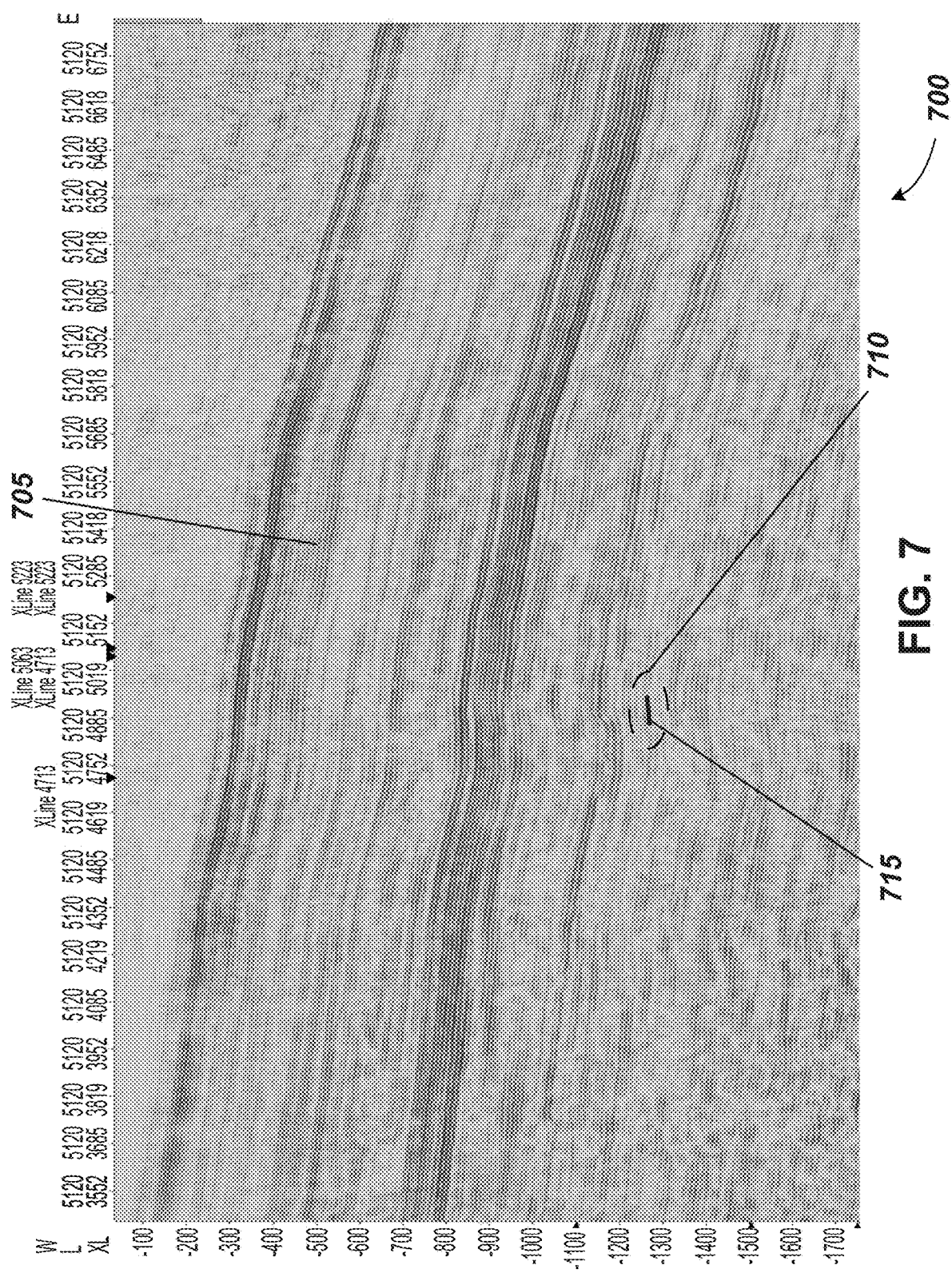
FIG. 7 is a data plot illustrating an example result of auto horizon picking performed on a 50 Hz filtered seismic volume, according to an implementation of the present disclosure.

FIG. 7 is a data plot illustrating an example result 700 of auto horizon picking performed on a 50 Hz filtered seismic volume 705, according to an implementation of the present disclosure. The 50 Hz filtered seismic volume 705 can be obtained by filtering the original seismic volume 205 used in FIG. 2 at a single frequency of 50 Hz. The 50 Hz filtered seismic volume 705 is displayed in the data plot as shown in FIG. 7, for example, through the GUI rendered by the computer system. The 2D auto-tracker is used to pick a horizon 710 corresponding to a location 715 that corresponds to the target horizon 215 in FIG. 2. In the example shown in FIG. 7, the identified horizon 710 is significantly shorter than the identified horizon 410 in FIG. 4.

Figure 8:
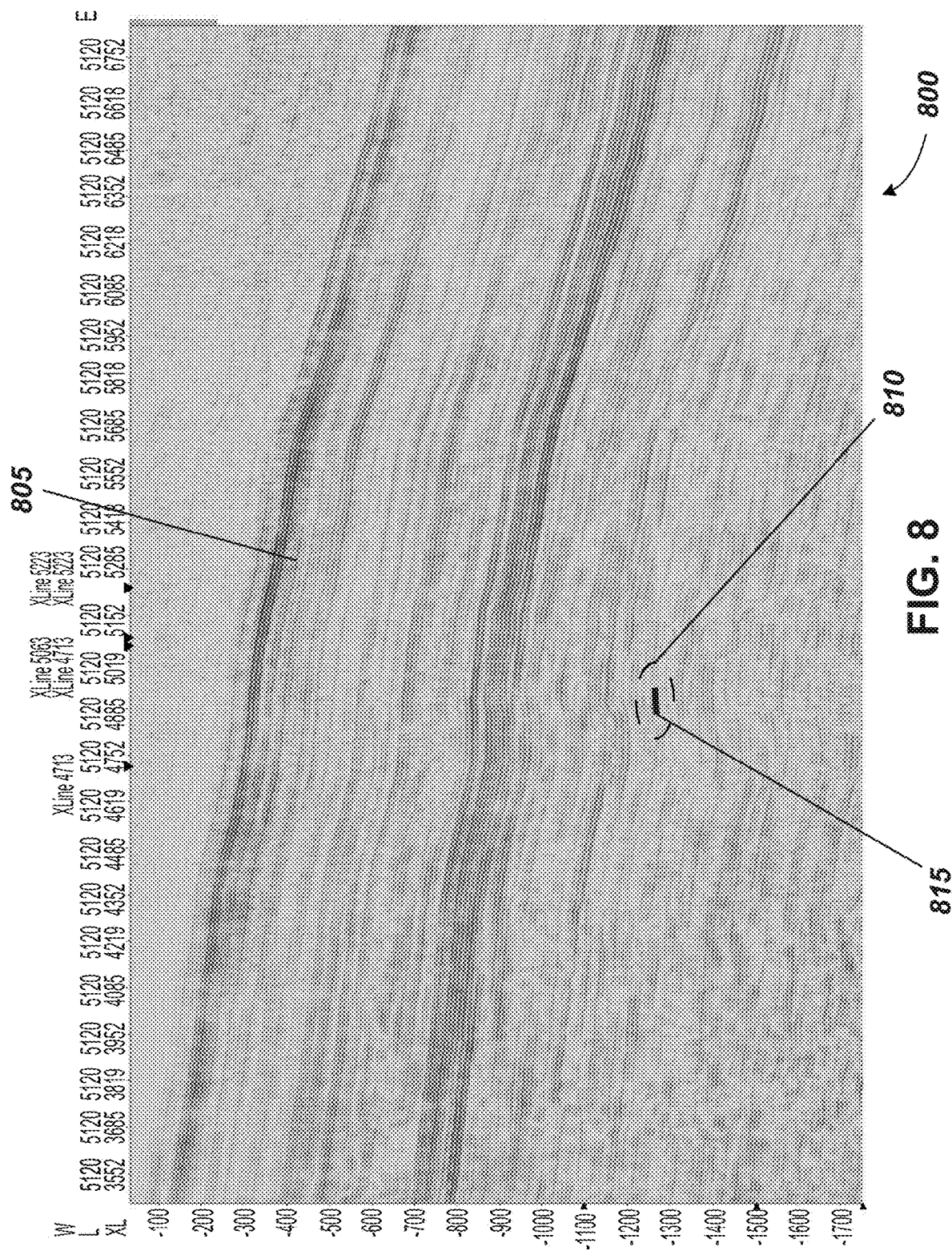
FIG. 8 is a data plot illustrating an example result of auto horizon picking performed on a 60 Hz filtered seismic volume, according to an implementation of the present disclosure.

FIG. 8 is a data plot illustrating an example result 800 of auto horizon picking performed on a 60 Hz filtered seismic volume 805, according to an implementation of the present disclosure. The 60 Hz filtered seismic volume 805 can be obtained by filtering the original seismic volume 205 used in FIG. 2 at a single frequency of 60 Hz. The 60 Hz filtered seismic volume 805 is displayed in the data plot as shown in FIG. 8, for example, through the GUI rendered by the computer system. The 2D auto-tracker is used to pick a horizon 810 corresponding to a location 815 that corresponds to the target horizon 215 in FIG. 2. In the example shown in FIG. 8, the identified horizon 810 is significantly shorter than the identified horizon 410 in FIG. 4.

As shown in FIGS. 3-8, each identified horizon 310, 410, 510, 610, 710, and 810 or part of a horizon has a distinct mono-frequency at which the horizon is smooth, continuous, and easy to pick. The frequency that gives rise to the largest continuity along the target horizon 215 is 20 Hz in this case among the recorded seismic frequency bandwidth ranging from 10 Hz to 60 Hz. As such, 20 Hz can be selected as the single frequency that gives rise to a predetermined continuity (that is, the largest continuity) for the target horizon. The single frequency can be used by the example method 150 for a more complete and accurate seismic analysis of the subterranean region. Referring back to FIG. 1B, from 154, method 150 proceeds to 156.

At 156, the seismic data is filtered to mono-frequency seismic data at the single frequency. The seismic data (for example, the stacked seismic volume) includes the multiple frequency components, whereas the mono-frequency seismic data includes a single-frequency component at the single frequency. The seismic data can be filtered, for example, by the data processing apparatus using existing frequency filters such as frequency pass filters. From 156, method 150 proceeds to 158.

At 158, a horizon corresponding to the target horizon is identified based on the mono-frequency seismic data. The horizon can be identified, for example, manually or automatically in a manner similar to or different from what is described previously. For example, the horizon can be identified by the data processing apparatus that runs an auto picker (for example, as a module of a seismic interpretation software). The auto picker can identify the horizon based on the mono-frequency seismic data, for example, according to one or more existing auto horizon picking algorithms as described previously in connection with the 2D and 3D auto pickers.

In some implementations, different target horizons (for example, target horizons located in different areas of interest of the subterranean region) may correspond to different single frequencies. In some implementations, steps 152 and 156 can be repeated to identify single frequencies that give rise to respective predetermined continuity corresponding to different targets horizons. Then, the horizons corresponding to the different target horizons can be identified based on respective mono-frequency seismic data at respective single frequencies. From 158, method 150 proceeds to 160.

At 160, the identified horizon corresponding to the target horizon is output for further analysis and interpretation of the subterranean region. The further analysis and interpretation of the subterranean region use the identified horizon. The identified horizon can be output by the data processing apparatus. In some implementations, the data processing apparatus outputs the identified horizon by displaying the identified horizon on an image of the seismic data (for example, the full stack seismic volume) for a user's review and analysis through a GUI on a display device associated with the data processing apparatus. In some implementations, the data processing apparatus outputs the identified horizon by saving the identified horizon on a computer-readable medium.

In some implementations, the data processing apparatus outputs the identified horizon by outputting the identified horizon to another module of a seismic interpretation system for determining geological features of the subterranean region based on the identified horizon. For example, geological features of the subterranean region can be determined based on the identified horizon. For example, determining geological features of the subterranean region based on the identified horizon includes estimating a thickness of a geological layer between the identified horizon and another horizon of the subterranean region. In some implementations, seismic features along the identified horizon, under the identified horizon, or between the identified horizon and another horizon of the subterranean region can be determined. The seismic features can be used to map geological features such as channels, faults, good sands, geological bodies, channels, and areas of lithology environment of depositions, and so on. In some implementations, the seismic features can be used to estimate the reserve of a reservoir and to locate potential areas to drill in the subterranean region. After 160, method 150 stops.

Figure 9:
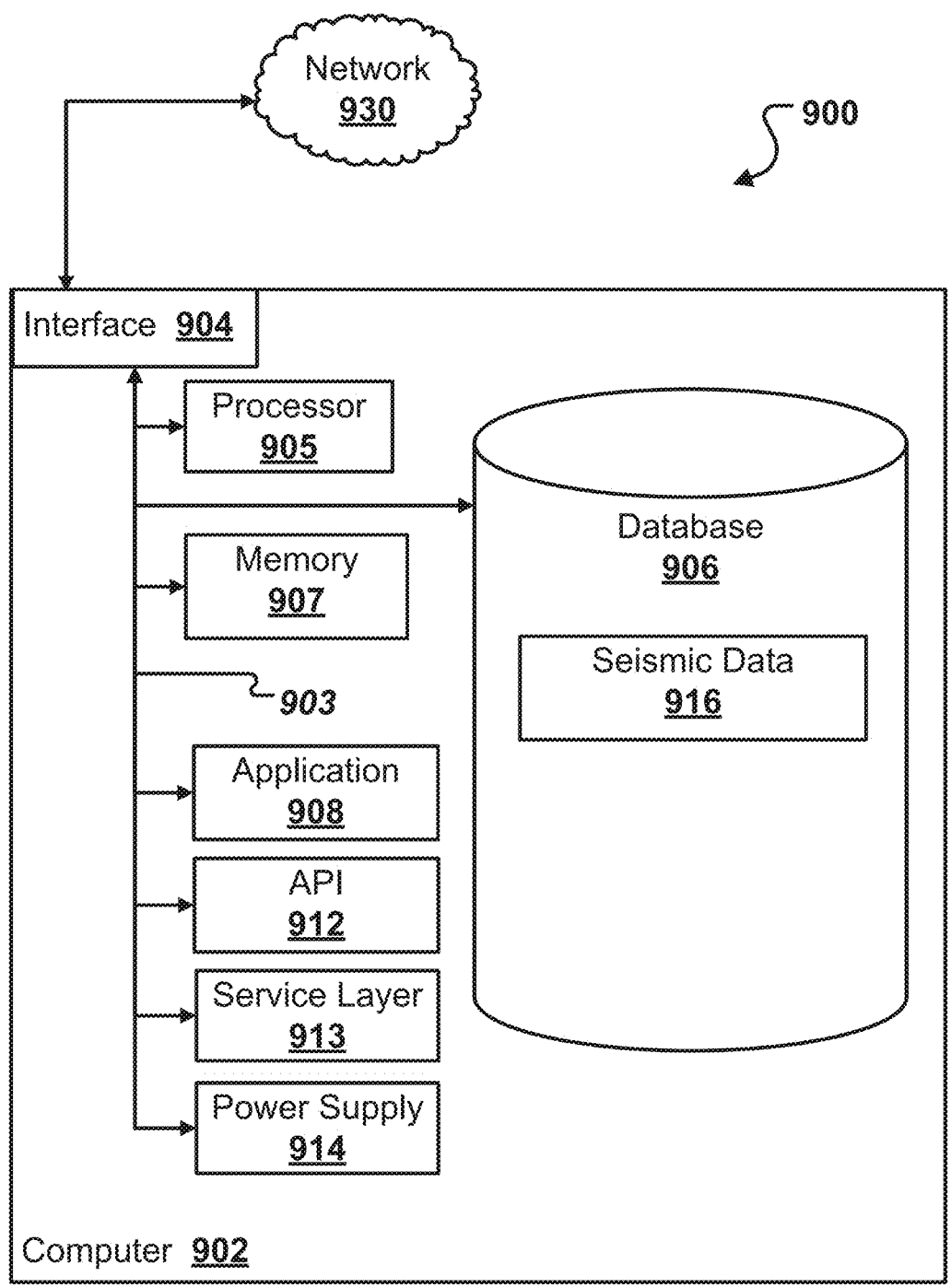
FIG. 9 is a block diagram illustrating an example of a computer system used to provide computational functionalities associated with described algorithms, methods, functions, processes, flows, and procedures, according to an implementation of the present disclosure.

FIG. 9 is a block diagram illustrating an example of a computer system 900 used to provide computational functionalities associated with described algorithms, methods, functions, processes, flows, and procedures, according to an implementation of the present disclosure. The illustrated computer 902 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 902 can comprise a computer that includes an input device, such as a keypad, keyboard, touch screen, another input device, or a combination of input devices that can accept user information, and an output device that conveys information associated with the operation of the computer 902, including digital data, visual, audio, similar type of information, or a combination of types of information, on a graphical-type user interface (UI) (or GUI) or other UI.

The computer 902 can serve in a role in a computer system as a client, a network component, a server, a database or another persistency, another role, or a combination of roles for performing the subject matter described in the present disclosure. The illustrated computer 902 is communicably coupled with a network 930. In some implementations, one or more components of the computer 902 can be configured to operate within an environment including cloud-computing-based, local, global, similar environment, or a combination of environments.

The computer 902 is an electronic computing device operable to receive, transmit, process, store, or manage data and information associated with the described subject matter. According to some implementations, the computer 902 can also include or be communicably coupled with a server, including an application server, e-mail server, web server, caching server, streaming data server, similar server, or a combination of servers.

The computer 902 can receive requests over network 930 (for example, from a client software application executing on another computer 902) and respond to the received requests by processing the received requests using a software application or a combination of software applications. In addition, requests can also be sent to the computer 902 from internal users (for example, from a command console or by another internal access method), external or third-parties, or other entities, individuals, systems, or computers.

Each of the components of the computer 902 can communicate using a system bus 903. In some implementations, any or all of the components of the computer 902, including hardware, software, or a combination of hardware and software, can interface over the system bus 903 using an application programming interface (API) 912, a service layer 913, or a combination of the API 912 and service layer 913. The API 912 can include specifications for routines, data structures, and object classes. The API 912 can be either computer-language independent or dependent and refer to a complete interface, a single function, or even a set of APIs. The service layer 913 provides software services to the computer 902 or other components (whether illustrated or not) that are communicably coupled to the computer 902. The functionality of the computer 902 can be accessible for all service consumers using this service layer. Software services, such as those provided by the service layer 913, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 902, alternative implementations can illustrate the API 912 or the service layer 913 as stand-alone components in relation to other components of the computer 902 or other components (whether illustrated or not) that are communicably coupled to the computer 902. Moreover, any or all parts of the API 912 or the service layer 913 can be implemented as a child or a sub-module of another software module, enterprise application, or hardware module without departing from the scope of the present disclosure.

The computer 902 includes an interface 904. Although illustrated as a single interface 904 in FIG. 9, two or more interfaces 904 can be used according to particular needs, desires, or particular implementations of the computer 902. The interface 904 is used by the computer 902 for communicating with another computing system (whether illustrated or not) that is communicatively linked to the network 930 in a distributed environment. Generally, the interface 904 is operable to communicate with the network 930 and comprises logic encoded in software, hardware, or a combination of software and hardware. More specifically, the interface 904 can comprise software supporting one or more communication protocols associated with communications such that the network 930 or interface's hardware is operable to communicate physical signals within and outside of the illustrated computer 902.

The computer 902 includes a processor 905. Although illustrated as a single processor 905 in FIG. 9, two or more processors can be used according to particular needs, desires, or particular implementations of the computer 902. Generally, the processor 905 executes instructions and manipulates data to perform the operations of the computer 902 and any algorithms, methods, functions, processes, flows, and procedures as described in the present disclosure.

The computer 902 also includes a database 906 that can hold data for the computer 902, another component communicatively linked to the network 930 (whether illustrated or not), or a combination of the computer 902 and another component. For example, database 906 can be an in-memory, conventional, or another type of database storing data consistent with the present disclosure. In some implementations, database 906 can be a combination of two or more different database types (for example, a hybrid in-memory and conventional database) according to particular needs, desires, or particular implementations of the computer 902 and the described functionality. Although illustrated as a single database 906 in FIG. 9, two or more databases of similar or differing types can be used according to particular needs, desires, or particular implementations of the computer 902 and the described functionality. While database 906 is illustrated as an integral component of the computer 902, in alternative implementations, database 906 can be external to the computer 902. As illustrated, the database 906 holds the previously described seismic data 916.

The computer 902 also includes a memory 907 that can hold data for the computer 902, another component or components communicatively linked to the network 930 (whether illustrated or not), or a combination of the computer 902 and another component. Memory 907 can store any data consistent with the present disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 or similar or differing types can be used according to particular needs, desires, or particular implementations of the computer 902 and the described functionality. While memory 907 is illustrated as an integral component of the computer 902, in alternative implementations, memory 907 can be external to the computer 902.

The application 908 is an algorithmic software engine providing functionality according to particular needs, desires, or particular implementations of the computer 902, particularly with respect to functionality described in the present disclosure. For example, application 908 can serve as one or more components, modules, or applications. Further, although illustrated as a single application 908, the application 908 can be implemented as multiple applications 908 on the computer 902. In addition, although illustrated as integral to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion or management circuits (including recharging, standby, or another power management functionality). In some implementations, the power-supply 914 can include a power plug to allow the computer 902 to be plugged into a wall socket or another power source to, for example, power the computer 902 or recharge a rechargeable battery.

There can be any number of computers 902 associated with, or external to, a computer system containing computer 902, each computer 902 communicating over network 930. Further, the term "client," "user," or other appropriate terminology can be used interchangeably, as appropriate, without departing from the scope of the present disclosure. Moreover, the present disclosure contemplates that many users can use one computer 902, or that one user can use multiple computers 902.

The forgoing detailed description describes frequency-based horizon interpretation based on seismic data, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, similar operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and similar optical memory technologies. The memory can store various objects or data, including caches, classes, frameworks, applications, modules, backup data, jobs, web pages, web page templates, data structures, database tables, repositories storing dynamic information, or similar appropriate information including any parameters, variables, algorithms, instructions, rules, constraints, or references. Additionally, the memory can include similar appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, similar communication network, or a combination of communication networks. The communication network can communicate with, for example, Internet Protocol (IP) packets, Frame Relay frames, Asynchronous Transfer Mode (ATM) cells, voice, video, data, or similar information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    receiving, by a data processing apparatus, seismic data of a subterranean region, the seismic data comprising a plurality of frequency components and having a frequency bandwidth spanning a spectrum in a frequency domain, wherein the seismic data is obtained from a seismic survey conducted of the subterranean region;
    identifying a target horizon based on the seismic data, the target horizon being a horizon to be picked based on the seismic data, the horizon representing a seismic reflector between two geological layers in the subterranean region;
    determining a single frequency from the frequency bandwidth of the seismic data that gives rise to a predetermined continuity along the target horizon;
    filtering the plurality of frequency components of the seismic data into the single frequency, thereby generating mono-frequency seismic data, the mono-frequency seismic data comprising a single-frequency component at the single frequency;
    identifying a horizon corresponding to the target horizon based on the mono-frequency seismic data; and
    outputting the identified horizon corresponding to the target horizon for determining geological features of the subterranean region based on the identified horizon.

2. The computer-implemented method of claim 1, wherein determining a single frequency from the frequency bandwidth of the seismic data that gives rise to a predetermined continuity along the target horizon comprises:
    decomposing the seismic data into a plurality of mono-frequency seismic data at a plurality of frequencies;
    identifying a plurality of respective horizons based on the plurality of mono-frequency seismic data;
    determining out of the plurality of respective horizons a horizon that has the predetermined continuity along the target horizon; and
    determining the single frequency that gives rise to the horizon that has the predetermined continuity along the target horizon.

3. The computer-implemented method of claim 2, wherein the horizon that has the predetermined continuity along the target horizon comprises a horizon that has a maximum continuity along the target horizon among the plurality of respective horizons.

4. The computer-implemented method of claim 1, wherein outputting the identified horizon comprises displaying the identified horizon on an image of the seismic data.

5. The computer-implemented method of claim 1, wherein identifying a target horizon based on the seismic data comprises receiving a user's selection of the target horizon based on the seismic data.

6. The computer-implemented method of claim 1, comprising determining geological features of the subterranean region based on the identified horizon.

7. The computer-implemented method of claim 1, wherein determining geological features of the subterranean region based on the identified horizon comprises estimating a thickness of a geological layer between the identified horizon and another horizon of the subterranean region.

8. A non-transitory, computer-readable medium storing one or more instructions executable by a computer system to perform operations comprising:
    receiving seismic data of a subterranean region, the seismic data comprising a plurality of frequency components and having a frequency bandwidth spanning a spectrum in a frequency domain, wherein the seismic data is obtained from a seismic survey conducted of the subterranean region;
    identifying a target horizon based on the seismic data, the target horizon being a horizon to be picked based on the seismic data, the horizon representing a seismic reflector between two geological layers in the subterranean region;
    determining a single frequency from the frequency bandwidth of the seismic data that gives rise to a predetermined continuity along the target horizon;
    filtering the plurality of frequency components of the seismic data into the single frequency, thereby generating mono-frequency seismic data, the mono-frequency seismic data comprising a single-frequency component at the single frequency;
    identifying a horizon corresponding to the target horizon based on the mono-frequency seismic data; and
    outputting the identified horizon corresponding to the target horizon for determining geological features of the subterranean region based on the identified horizon.

9. The non-transitory, computer-readable medium of claim 8, wherein determining a single frequency from the frequency bandwidth of the seismic data that gives rise to a predetermined continuity along the target horizon comprises:
    decomposing the seismic data into a plurality of mono-frequency seismic data at a plurality of frequencies;
    identifying a plurality of respective horizons based on the plurality of mono-frequency seismic data;
    determining out of the plurality of respective horizons a horizon that has the predetermined continuity along the target horizon; and
    determining the single frequency that gives rise to the horizon that has the predetermined continuity along the target horizon.

10. The non-transitory, computer-readable medium of claim 9, wherein the horizon that has the predetermined continuity along the target horizon comprises a horizon that has a maximum continuity along the target horizon among the plurality of respective horizons.

11. The non-transitory, computer-readable medium of claim 8, wherein outputting the identified horizon comprises displaying the identified horizon on an image of the seismic data.

12. The non-transitory, computer-readable medium of claim 8, wherein identifying a target horizon based on the seismic data comprises receiving a user's selection of the target horizon based on the seismic data.

13. The non-transitory, computer-readable medium of claim 8, wherein the operations further comprises determining geological features of the subterranean region based on the identified horizon.

14. The non-transitory, computer-readable medium of claim 8, wherein determining geological features of the subterranean region based on the identified horizon comprises estimating a thickness of a geological layer between the identified horizon and another horizon of the subterranean region.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
receiving seismic data of a subterranean region, the seismic data comprising a plurality of frequency components and having a frequency bandwidth spanning a spectrum in a frequency domain, wherein the seismic data is obtained from a seismic survey conducted of the subterranean region;
identifying a target horizon based on the seismic data, the target horizon being a horizon to be picked based on the seismic data, the horizon representing a seismic reflector between two geological layers in the subterranean region;
determining a single frequency from the frequency bandwidth of the seismic data that gives rise to a predetermined continuity along the target horizon;
filtering the plurality of frequency components of the seismic data into the single frequency, thereby generating mono-frequency seismic data, the mono-frequency seismic data comprising a single-frequency component at the single frequency;
identifying a horizon corresponding to the target horizon based on the mono-frequency seismic data; and
outputting the identified horizon corresponding to the target horizon for determining geological features of the subterranean region based on the identified horizon.

16. The computer-implemented system of claim 15, wherein determining a single frequency from the frequency bandwidth of the seismic data that gives rise to a predetermined continuity along the target horizon comprises:
decomposing the seismic data into a plurality of mono-frequency seismic data at a plurality of frequencies;
identifying a plurality of respective horizons based on the plurality of mono-frequency seismic data;
determining out of the plurality of respective horizons a horizon that has the predetermined continuity along the target horizon; and
determining the single frequency that gives rise to the horizon that has the predetermined continuity along the target horizon.

17. The computer-implemented system of claim 16, wherein the horizon that has the predetermined continuity along the target horizon comprises a horizon that has a maximum continuity along the target horizon among the plurality of respective horizons.

18. The computer-implemented system of claim 15, wherein outputting the identified horizon comprises displaying the identified horizon on an image of the seismic data.

19. The computer-implemented system of claim 15, wherein identifying a target horizon based on the seismic data comprises receiving a user's selection of the target horizon based on the seismic data.

20. The computer-implemented system of claim 15, wherein the operations further comprises determining geological features of the subterranean region based on the identified horizon, wherein determining geological features of the subterranean region based on the identified horizon comprises estimating a thickness of a geological layer between the identified horizon and another horizon of the subterranean region.

* * * * *